United States Patent
Fu et al.

(10) Patent No.: US 8,570,437 B2
(45) Date of Patent: Oct. 29, 2013

(54) TV SET AND METHOD FOR VIDEO MESSAGING THEREOF

(75) Inventors: Yaoyuan Fu, Shenzhen (CN); Tongjun Wang, Shenzhen (CN); Yihua Chen, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/378,365

(22) PCT Filed: Jun. 19, 2009

(86) PCT No.: PCT/CN2009/000675
§ 371 (c)(1),
(2), (4) Date: Dec. 15, 2011

(87) PCT Pub. No.: WO2010/145051
PCT Pub. Date: Dec. 23, 2010

(65) Prior Publication Data
US 2012/0092554 A1    Apr. 19, 2012

(30) Foreign Application Priority Data
Jun. 19, 2009    (CN) ................. PCT/CN2009/000675

(51) Int. Cl.
*H04N 5/445* (2011.01)
(52) U.S. Cl.
USPC ........................................................ 348/552
(58) Field of Classification Search
USPC ................................ 348/552, 553, 725, 14.06
See application file for complete search history.

(56) References Cited

U.S. PATENT DOCUMENTS

| | | | |
|---|---|---|---|
| 6,941,269 B1 * | 9/2005 | Cohen et al. | 704/275 |
| 7,681,219 B2 * | 3/2010 | Conradt et al. | 725/86 |
| 2002/0047892 A1 * | 4/2002 | Gonsalves, Jr. | 348/14.06 |
| 2003/0041333 A1 * | 2/2003 | Allen et al. | 725/106 |
| 2004/0193900 A1 * | 9/2004 | Nair | 713/193 |
| 2006/0080741 A1 * | 4/2006 | Nair | 726/26 |
| 2006/0119707 A1 * | 6/2006 | Merrell et al. | 348/207.99 |
| 2007/0186002 A1 * | 8/2007 | Campbell et al. | 709/231 |
| 2009/0089188 A1 * | 4/2009 | Ku et al. | 705/30 |
| 2012/0086769 A1 * | 4/2012 | Huber et al. | 348/14.08 |

FOREIGN PATENT DOCUMENTS

CN    1921552 A    2/2007

OTHER PUBLICATIONS

International Search Report of PCT/CN2009/000675.

* cited by examiner

Primary Examiner — Paulos M Natnael

(57) ABSTRACT

The present disclosure provides a TV set and a method for video messaging thereof. The method includes the following steps: a: acquiring an image and a voice message signal of a video message producer as a video message and storing the video message; b: receiving a control instruction of viewing a video message from a video message viewer and searching from stored video messages for any video message for the video message viewer, wherein if the answer is "yes", the step c is implemented; and c: invoking the video message for the video message viewer, displaying the image of the video message producer through the TV set, and playing the voice message through a loud speaker. With the present disclosure, users can leave or read a video message when using the TV set. This extends the functions of the TV set and gives users brand new experiences.

12 Claims, 2 Drawing Sheets

TV SET AND METHOD FOR VIDEO MESSAGING THEREOF

BACKGROUND

1. Technical Field

The present disclosure relates to the technical filed of television (TV), and more particularly, to a TV set and a method for video messaging thereof.

2. Description of Related Art

Owing to advancement of related technologies, TV sets are now provided with more and more powerful functions, and are expected to become home information centers. In addition to the basic function of playing TV programs, TV sets can also play recorded videos and even allow for browsing on the Internet. Accordingly, TV sets have almost become a necessity of numerous families However, although the functions of TV sets are powerful, these functions are mostly limited to signal receiving and displaying.

Accordingly, there is a need in the art to provide a solution for video messaging when using a TV set.

BRIEF SUMMARY

An objective of the present disclosure is to provide a TV set and a method for video messaging thereof, which allows users to leave video messages when using the TV set.

The objective of the present disclosure is achieved in the following way. The present disclosure provides a TV set, which includes a display screen, a loud speaker, a display processing unit and a sound processing unit. The TV set further includes a control unit, a storage unit, an image acquiring unit, a sound acquiring unit, an image/sound processing unit, an encoding unit and a decoding unit.

The image acquiring unit is configured to acquire an image signal of a video message producer and transmit the image signal to the image/sound processing unit.

The sound acquiring unit is configured to acquire a voice message signal of the video message producer and transmit the voice message signal to the image/sound processing unit.

The image/sound processing unit is configured to process the image signal and the voice message signal and transmit the processed signals to the encoding unit.

The encoding unit is configured to encode the image signal and the voice message signal and transmit the encoded signals to the storage unit for storage.

The storage unit is configured to store the encoded image signal and the encoded voice message signal.

The decoding unit is configured to read and decode the image signal and the voice message signal from the storage unit, transmit the decoded image signal to the display processing unit and transmit the decoded sound signal to the sound processing unit.

The control unit is configured to control the image acquiring unit to acquire the image signal of the video message producer, control the sound acquiring unit to acquire the voice message signal of the video message producer, and control the decoding unit to decode a video message for a video message viewer read from the storage unit.

The image acquiring unit is further configured to acquire an image signal of the video message viewer, and the control unit is further configured to search in the storage unit for any video message for the video message viewer according to the image signal of the video message viewer.

The image acquiring unit is configured to acquire an image signal of a person who possibly receives the video message, and the storage unit is further configured to store the image signal of the person who possibly receives the video message as identity (ID) identification information of the person.

The control unit is further configured to compare the image signal of the video message viewer with the ID identification information of the person who possibly receives the video message, and determine if there is any video message for the video message viewer.

The TV set further includes a network unit connected with the control unit. The network unit is configured to read the image signal and the voice message signal from the storage unit, and transmit the image signal and the voice message signal to a corresponding network address.

The present disclosure further provides a method for video messaging through use of a TV set, which includes the following steps of:

a: acquiring an image and a voice message signal of a video message producer as a video message and storing the video message;

b: receiving a control instruction of viewing a video message from a video message viewer and searching from stored video messages for any video message for the video message viewer, wherein if the answer is "yes", then the method proceeds to the step c; and c: invoking the video message for the video message viewer, displaying the image of the video message producer on a display screen of the TV set, and playing the voice message through a loud speaker of the TV set.

The method further includes the following step before the step a:

a0: acquiring an image and/or a sound signal of a person who possibly receives the video message, and storing the image and/or the sound signal of the person who possibly receives the video message as ID identification information of the person.

The step a includes:

a1: receiving a control instruction of selecting a video message receiving person from the video message producer, invoking a list of persons who possibly receive the video message, and receiving an instruction of selecting one of the persons from the list; and a2: receiving the image and the voice message signal of the video message producer as a video message and storing the video message, and creating a correspondence relationship between the video message and the person selected by the video message producer.

The step b includes:

b1: receiving a control instruction of viewing a video message from the video message viewer, acquiring an image and/or a sound signal of the video message viewer, and determining whether the video message viewer is the person selected by the video message producer.

The step b further includes:

if the answer is "no", then displaying a prompt information that there is no video message.

According to the present disclosure, video messages are stored in the TV set and, when a video message viewer desires to view a video message for him, the video message for the viewer will be displayed and played. The technical solution of the present disclosure can impart a video messaging function to the TV set so that the user can leave or read a video message when using the TV set. This extends the functions of the TV set and gives users brand new experiences.

Figure 1:
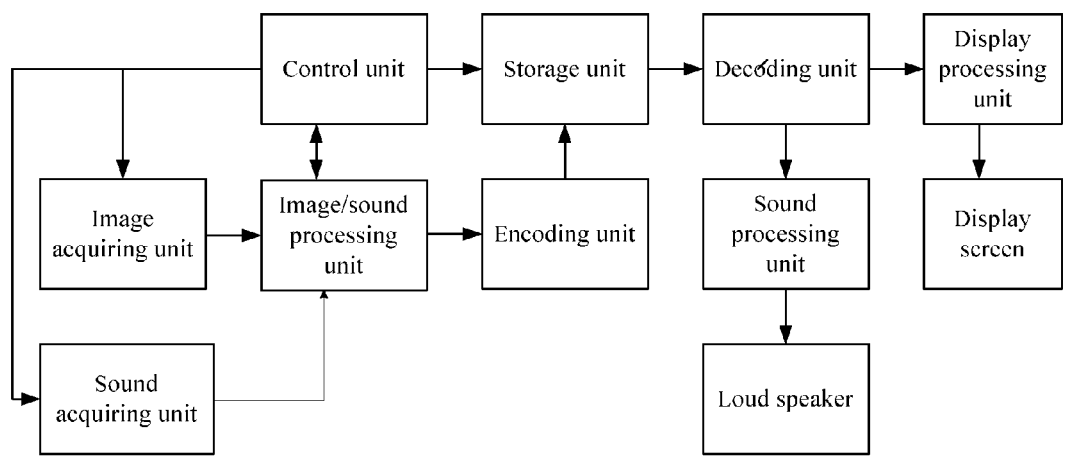
FIG. 1 is a schematic block diagram of a TV set according to an embodiment of the present disclosure.

Hereinafter, implementations, functional features and advantages of the present disclosure will be further described with reference to embodiments thereof and the attached drawings.

DETAILED DESCRIPTION

To make the objectives, technical solutions and advantages of the present disclosure clearer, the present disclosure will be further described hereinbelow with reference to the attached drawings and embodiments thereof. It shall be understood that, the embodiments described herein are only intended to illustrate but not to limit the present disclosure.

In application of the technical solution of the present disclosure, identity (ID) identification information of persons who possibly receive a video message (e.g., facial images and/or sound information of family members) shall be firstly pre-recorded and stored into a memory of a TV set, in which a correspondence relationship between a name and ID identification information of each of the persons who possibly receive a video message is created.

When a user needs to leave a video message, a "producing a video message" item in a menu of the TV set is activated firstly. The system invokes a name list of the persons who possibly receive the video message from the memory. The user selects and confirms a name of one of the persons who will receive this video message from the name list. Thereafter, the system enters into an operating state, and a corresponding procedure is performed to convert and compression encode a facial image and a sound signal of the video message of the user for storage into a storage space corresponding to the person who will receive this video message. In the present disclosure, the person who produces the video message is called "video message producer", and the person who views the video message is called "video message viewer".

When one of the family members gets home, he may see if there is any video message for him when using the TV set. Firstly, he powers on the TV set to display the menu, and activates a "playing a video message" item in the menu. Then, the system acquires a facial image and/or a sound of the "video message viewer", and searches in the memory for any video message for the "video message viewer" according to the facial image and/or the sound of the "video message viewer". If the answer is "yes", then the video message data in the memory is read and decoded for display processing and sound processing; and then the image is displayed on a display screen and the sound is played through a loud speaker. If the answer is "no", then prompt information of "there is no video message" is displayed.

The technical solution of the present disclosure can further achieve the video message automatic prompting function. When one of the family members gets home and powers on the TV set, the system will firstly search for stored video messages and generate OSD prompt information (e.g., "there is a video message for x x x, please view it") according to the searching result to prompt a video message receiving person to receive a video message. If there is no video message in the memory, then prompt information of "there is no video message" is displayed.

Referring to FIG. 1, there is shown a schematic block diagram of a TV set according to an embodiment of the present disclosure. The TV set includes a display screen, a loud speaker, a control unit, a storage unit, an image acquiring unit, a sound acquiring unit, an image/sound processing unit, an encoding unit, a decoding unit, a display processing unit and a sound processing unit.

The image acquiring unit connected with the image/sound processing unit is configured to acquire a facial image of a person who possibly receives a video message and facial images of a "video message producer" and a "video message viewer".

The sound acquiring unit connected with the image/sound processing unit is configured to acquire a sound of the person who possibly receives a video message, a voice message of the "video message producer" and a sound signal of the "video message viewer".

The image/sound processing unit connected with the encoding unit is configured to process (e.g., amplify, filter and A/D convert) the image signal and the sound signal and transmit the processed signals to the encoding unit.

The encoding unit connected with the storage unit is configured to encode the image signal and the sound signal and transmit the encoded signals to the storage unit for storage.

The storage unit connected with the encoding unit and the decoding unit is configured to store the encoded image signal and the encoded sound signal including the facial image and the sound of the person who possibly receives a video message as well as the facial image and the voice message of the "video message producer". If necessary, the storage unit under control of the control unit transmits the aforesaid information data to the decoding unit for decoding.

The decoding unit connected with the storage unit, the sound processing unit and the display processing unit is configured to read and decode the encoded image signal and the encoded sound signal from the storage unit, transmit the decoded image signal to the display processing unit and transmit the decoded sound signal to the sound processing unit.

The display processing unit connected with the display screen is configured to perform display processing on the facial image of the "video message producer", and the display screen is configured to display the facial image.

The sound processing unit connected with the loud speaker is configured to process the voice message of the "video message producer", and the loud speaker is configured to play the voice message.

The control unit connected with other functional units (some connection relationships are not shown) is configured to control operations of the entire system, for example, control the image acquiring unit to acquire the facial image of the "video message producer", control the sound acquiring unit to acquire the voice message of the "video message producer", control the image acquiring unit to acquire the facial image of the "video message viewer", control the sound acquiring unit to acquire the sound of the "video message viewer", search in the storage unit for any video message for the "video message viewer", and control the decoding unit to read from the storage unit a video message for the "video message viewer" for decoding.

In particular, the TV set according to this embodiment of the present disclosure may further include a network unit connected with the control unit. The ID identification information of the person who possibly receives the video message may further include a network address of the person. After the video message is produced by the "video message producer", the network unit is connected to a network to transmit the video message to the network address of the person.

Figure 2:
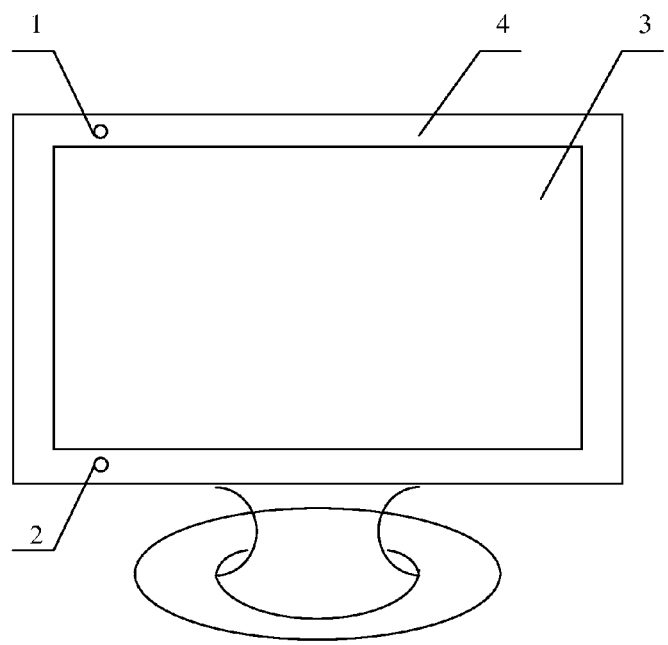
FIG. 2 is a schematic view of the TV set according to the embodiment of the present disclosure.

In application of the technical solution of the present disclosure, a camera may be used as the image acquiring unit and a pickup may be used as the sound acquiring unit. Referring to FIG. 2, there is shown a schematic view of the TV set according to the embodiment of the present disclosure. As shown in FIG. 2, the reference numeral 1 represents a camera, which, in this embodiment, is arranged at a top left corner on a frame of the TV set in consideration of common shooting angles and irradiation angles of light. In principle, the camera 1 may also be arranged at any positions on the frame of the screen. The reference numeral 2 represents a pickup, which, in this embodiment, is arranged at a bottom left corner on the frame of the TV set so as to facilitate pickup of the sound. Of course, the pickup 2 may also be located at any positions on the frame of the screen of the TV set. The reference numeral 3 represents the display screen, and the reference numeral 4 represents the frame of the display screen.

Figure 3:
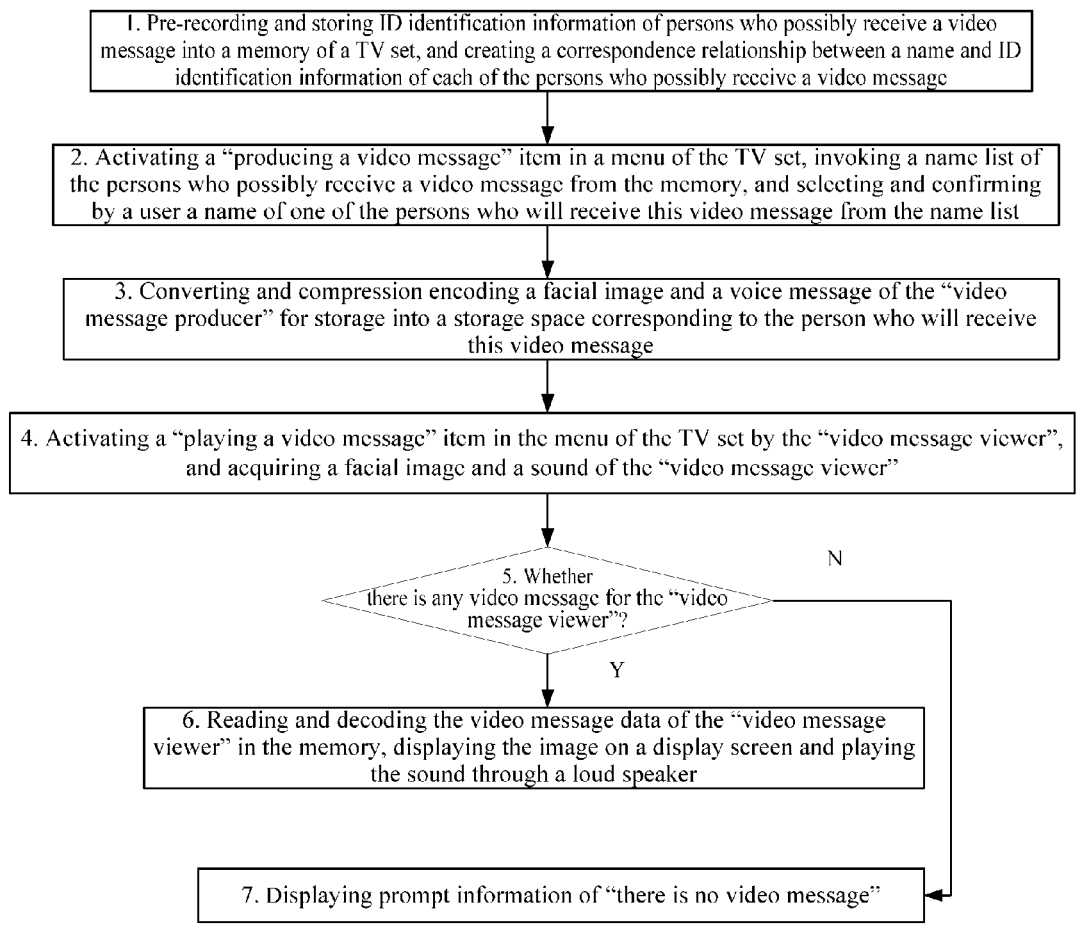
FIG. 3 is a flowchart diagram according to an embodiment of the present disclosure.

Referring to FIG. 3, there is shown a flowchart diagram according to an embodiment of the present disclosure. The method includes the following steps of:

1. pre-recording and storing ID identification information of persons who possibly receive a video message into a memory of a TV set, and creating a correspondence relationship between a name and ID identification information of each of the persons who possibly receive a video message;

2. activating a "producing a video message" item in a menu of the TV set, invoking a name list of the persons who possibly receive a video message from the memory, and selecting and confirming by a user a name of one of the persons who will receive this video message from the name list;

3. converting and compression encoding a facial image and a voice message of the "video message producer" for storage into a storage space corresponding to the person who will receive this video message;

4. activating a "playing a video message" item in the menu of the TV set by the "video message viewer", and acquiring a facial image and a sound of the "video message viewer";

5. searching in the memory for any video message for the "video message viewer" according to the facial image and the sound of the "video message viewer", wherein if the answer is "yes", then the method proceeds to the step 6, otherwise the method proceeds to the step 7;

6. reading and decoding the video message data of the "video message viewer" in the memory, displaying the image on a display screen and playing the sound through a loud speaker; and 7. displaying prompt information of "there is no video message".

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

The invention claimed is:

1. A television (TV) set, comprising a display screen, a loud speaker, a display processing unit and a sound processing unit, wherein the TV set further comprises a control unit, a storage unit, an image acquiring unit, a sound acquiring unit, an image/sound processing unit, an encoding unit and a decoding unit, wherein:
   the image acquiring unit is configured to acquire an image signal of a video message producer and transmit the image signal to the image/sound processing unit;
   the sound acquiring unit is configured to acquire a voice message signal of the video message producer and transmit the voice message signal to the image/sound processing unit;
   the image/sound processing unit is configured to process the image signal and the voice message signal and transmit the processed signals to the encoding unit;
   the encoding unit is configured to encode the image signal and the voice message signal and transmit the encoded signals to the storage unit for storage;
   the storage unit is configured to store the encoded image signal and the encoded voice message signal as a video message;
   the image acquiring unit is further configured to acquire an image signal of a person who receives the video message;
   the sound acquiring unit is further configured to acquire a sound signal of a person who receives the video message;
   the storage unit is further configured to store a list of the persons who receives the video message and store the image and/or the sound signal of the person who receives the video message as ID identification information of the person;
   the decoding unit is configured to read and decode the image signal and the voice message signal from the storage unit, transmit the decoded image signal to the display processing unit and transmit the decoded sound signal to the sound processing unit; and
   the control unit is configured to control the image acquiring unit to acquire the image signal of the video message producer, control the sound acquiring unit to acquire the voice message signal of the video message producer, and control the decoding unit to read from the storage unit a video message for a video message viewer for decoding,
   the image acquiring unit and the sound acquiring unit acquire the image and the voice message signal of the video message producer by receiving a control instruction of selecting a video message receiving person from the video message producer, invoking the list of persons who receive the video message, receiving an instruction of selecting one of the persons from the list, receiving the image and the voice message signal of the video message producer stored in the storage unit as the video message, and creating a correspondence relationship between the video message and the person selected by the video message producer.

2. The TV set of claim 1, wherein the image acquiring unit is further configured to acquire an image signal of the video message viewer, and the control unit is further configured to search in the storage unit for any video message for the video message viewer according to the image signal of the video message viewer.

3. The TV set of claim 2, wherein the image acquiring unit is configured to acquire an image signal of a person who receives the video message, and the storage unit is further configured to store the image signal of the person who receives the video message as identity (ID) identification information of the person.

4. The TV set of claim 3, wherein the control unit is further configured to compare the image signal of the video message viewer with the ID identification information of the person who receives the video message, and determine if there is any video message for the video message viewer.

5. The TV set of claim 1, further comprising a network unit connected with the control unit, wherein the network unit is configured to read the image signal and the voice message signal from the storage unit, and transmit the image signal and the voice message signal to a corresponding network address.

6. A method for video messaging through use of a TV set, comprising the following steps of:

a0: acquiring an image and/or a sound signal of a person who receives a video message, and storing the image and/or the sound signal of the person who receives the video message as ID identification information of the person;

a: acquiring an image and a voice message signal of a video message producer as the video message and storing the video message; comprising: a1: receiving a control instruction of selecting a video message receiving person from the video message producer, invoking a list of persons who receive the video message, and receiving an instruction of selecting one of the persons from the list; and a2: receiving the image and the voice message signal of the video message producer as the video message and storing the video message, and creating a correspondence relationship between the video message and the person selected by the video message producer;

b: receiving a control instruction of viewing a video message from a video message viewer and searching from stored video messages for any video message for the video message viewer, wherein if the answer is "yes", then the method proceeds to the step c; and c: invoking the video message for the video message viewer, displaying the image of the video message producer on a display screen of the TV set, and playing the voice message through a loud speaker of the TV set.

7. The method of claim 6, wherein the step b comprises:
b1: receiving a control instruction of viewing a video message from the video message viewer, acquiring an image and/or a sound signal of the video message viewer, and determining whether the video message viewer is the person selected by the video message producer.

8. The method of claim 6, wherein the step b further comprises:
if the answer is "no", then displaying prompt information that there is no video message.

9. A method for video messaging through use of a TV set, comprising the following steps of:

a: acquiring an image and a voice message signal of a video message producer as a video message and storing the video message; comprising: a1: receiving a control instruction of selecting a video message receiving person from the video message producer, invoking a list of persons who receive the video message, and receiving an instruction of selecting one of the persons from the list; and a2: receiving the image and the voice message signal of the video message producer as a video message and storing the video message, and creating a correspondence relationship between the video message and the person selected by the video message producer;

b: receiving a control instruction of viewing a video message from a video message viewer and searching from stored video messages for any video message for the video message viewer, wherein if the answer is "yes", then the method proceeds to the step c; and c: invoking the video message for the video message viewer, displaying the image of the video message producer on a display screen of the TV set, and playing the voice message through a loud speaker of the TV set.

10. The method of claim 9, further comprising the following step before the step a:
a0: acquiring an image and/or a sound signal of a person who receives the video message, and storing the image and/or the sound signal of the person who receives the video message as ID identification information of the person.

11. The method of claim 9, wherein the step b comprises:
b1: receiving a control instruction of viewing a video message from the video message viewer, acquiring an image and/or a sound signal of the video message viewer, and determining whether the video message viewer is the person selected by the video message producer.

12. The method of claim 9, wherein the step b further comprises:
if the answer is "no", then displaying prompt information that there is no video message.

* * * * *